United States Patent [19]
Komatsu

[11] Patent Number: 5,675,577
[45] Date of Patent: Oct. 7, 1997

[54] INTERNETWORK ROUTING USING DIFFERENT SERVICE CATEGORIES FOR ESTABLISHING ALTERNATE ROUTE

[75] Inventor: Masaki Komatsu, Tokyo, Japan

[73] Assignee: NEC Corporation, Tokyo, Japan

[21] Appl. No.: 571,248

[22] Filed: Dec. 12, 1995

[30] Foreign Application Priority Data

Dec. 14, 1994 [JP] Japan .................. 6-310851

[51] Int. Cl.$^6$ .................................. H04L 12/26
[52] U.S. Cl. ................................ 370/237; 379/221
[58] Field of Search .................. 370/237, 238, 370/235, 230, 229; 379/221, 225, 9

[56] References Cited

U.S. PATENT DOCUMENTS

| | | | |
|---|---|---|---|
| 4,119,815 | 10/1978 | Frankfort et al. | 379/221 |
| 5,042,032 | 8/1991 | Dighe et al. | 370/94.1 |
| 5,210,740 | 5/1993 | Anzai et al. | 379/221 |
| 5,212,691 | 5/1993 | Hokari | 370/110.1 |
| 5,253,288 | 10/1993 | Frey et al. | 379/221 |
| 5,442,622 | 8/1995 | Hokari | 370/16 |
| 5,515,418 | 5/1996 | Yamaguchi et al. | 379/221 |

FOREIGN PATENT DOCUMENTS

| | | |
|---|---|---|
| 64-30393 | 2/1989 | Japan . |
| 2-190060 | 7/1990 | Japan . |

*Primary Examiner*—Douglas W. Olms
*Assistant Examiner*—Matthew C. Phillips
*Attorney, Agent, or Firm*—Whitham, Curtis, Whitham & McGinn

[57] ABSTRACT

In an inter-PBX routing apparatus, calls from channels of different service categories to a destination are normally carried by a first route. A controller determines the available bandwidth remaining in the first route, classifies the channels as a first or a second category if they cannot or can tolerate delays when establishing an alternate route, respectively, or a third category if they do not require the second route when the first route is overflowed. A second route is established on a pre-assigned basis when the bandwidth of at least one idle channel of the first category is greater than the available bandwidth and on a demand-assigned basis in response to a request from a channel of the second category having a bandwidth greater than the available bandwidth. When the second route is established, the controller controls a switch to establish a path between a requesting channel and the first route if the requested bandwidth is equal to or smaller than the available bandwidth or a path between it and the second route if the requesting channel is classified as the first or second category and the request bandwidth is greater than the available bandwidth. The controller returns a busy tone to the requesting channel if the requested bandwidth is greater than the available bandwidth.

15 Claims, 5 Drawing Sheets

INTERNETWORK ROUTING USING DIFFERENT SERVICE CATEGORIES FOR ESTABLISHING ALTERNATE ROUTE

BACKGROUND OF THE INVENTION

1. Field of the Invention

The present invention relates generally to alternate routing of calls in the event of traffic overflow, and more specifically to a routing technique that can be cost-effectively used for calls between private networks using a public switched network as a backup route, where delay are encountered in establishing the backup route.

2. Description of the Related Art

Inter-PBX (private branch exchange) routing switches for routing calls from the private (dedicated of leased) line to a public-switched route when the private line is overflowed are known in the switching art, as shown and described in Japanese Provisional Patent Publication Sho-64-30393. It is also known in Japanese Provisional Patent Publication Hei-2-190060 that public-switched backup routes are pre-established to avoid delays which would be experienced if they were established on an "as-needed" basis when a call is initiated. In practice, a circuit-usage threshold is used for determining when to pre-establish a backup route in order to ensure that simultaneous calls from at least two channels can be routed without delays through the backup route. For example, if the routing switch accommodates channels of different transmission speeds of 64-, 48-, 32-, 16- and 8-kbps and these channels cannot tolerate delays in establishing an alternate route, and if a private line with a maximum bandwidth of 128 kbps is provided, the usage-threshold is calculated by the relation (128−64−48)/128=12.5 (%) to ensure that simultaneous calls from the highest speed channels can be served without delays. This implies that if the routing system serves a wide range of transmission speed a public switched route will be established frequently although its utilization is low.

SUMMARY OF THE INVENTION

It is therefore an object of the present invention to provide a cost-effective apparatus and method for establishing an alternate route between networks.

In a broader aspect, the present invention provides an apparatus for establishing an alternate route for a plurality of channels of different bandwidths in addition to a first transmission route when the first transmission route is overflowed. According to the present invention, the channels are classified under a first category if they cannot tolerate delays when establishing an alternate transmission route, or as a second category if they can tolerate said delays. A second mission route is established on a pre-assigned basis when the bandwidth of at least one idle channel of the first category is greater than the bandwidth available in the first transmission route. The second transmission route is also established in response to a request from a channel of the second category on a demand-assigned basis if this requesting channel has a bandwidth greater than the available bandwidth of the first transmission route.

The second transmission route is cleared under conditions that no traffic is carried by the second transmission route and at least one idle channel of the first category has a bandwidth equal to or smaller than a bandwidth available in said first transmission route.

According to a further aspect, the present invention provides a routing apparatus comprising a switch connected between a plurality of channels and a first transmission route having a predetermined bandwidth for carrying traffic to a destination. A controller is provided for determining an available bandwidth remaining in the first transmission route, classifying the plurality of channels as first or second category if the channels cannot or can tolerate delays when establishing a second transmission route, respectively, establishing the second transmission route between the switch and the destination on a pre-assigned basis depending on bandwidths of idle channels of the first category relative to the available bandwidth and on a demand-assigned basis in response to a request from a channel of the second category having a bandwidth greater than the available bandwidth. The switch is controlled for connecting a requesting channel to the first transmission route if the requesting channel has a bandwidth equal to or smaller than the available bandwidth or connecting it to the second transmission route if the requesting channel is the first or second category and its bandwidth is greater than the available bandwidth of the first transmission route.

In preferred aspect, the controller selects at least one idle channel of the first category in descending order of bandwidths and establishes the second transmission route if the selected idle channels have a total bandwidth greater than the available bandwidth. The controller may include means for returning a busy tone to the request from a channel of a third category which requires no alternate route when the first transmission route is overflowed if the third category channel has a bandwidth greater than the bandwidth available in the first transmission route. The controller may further include means for detecting when no traffic is carried by the second transmission route, selecting at least one idle channel of the first category in descending order of bandwidths and clearing the second transmission route if the selected idle channel has a bandwidth equal to or smaller than the available bandwidth.

BRIEF DESCRIPTION OF THE DRAWINGS

The present invention will be described in further detail with reference to the accompanying drawings, in which.

DETAILED DESCRIPTION

Figure 1:
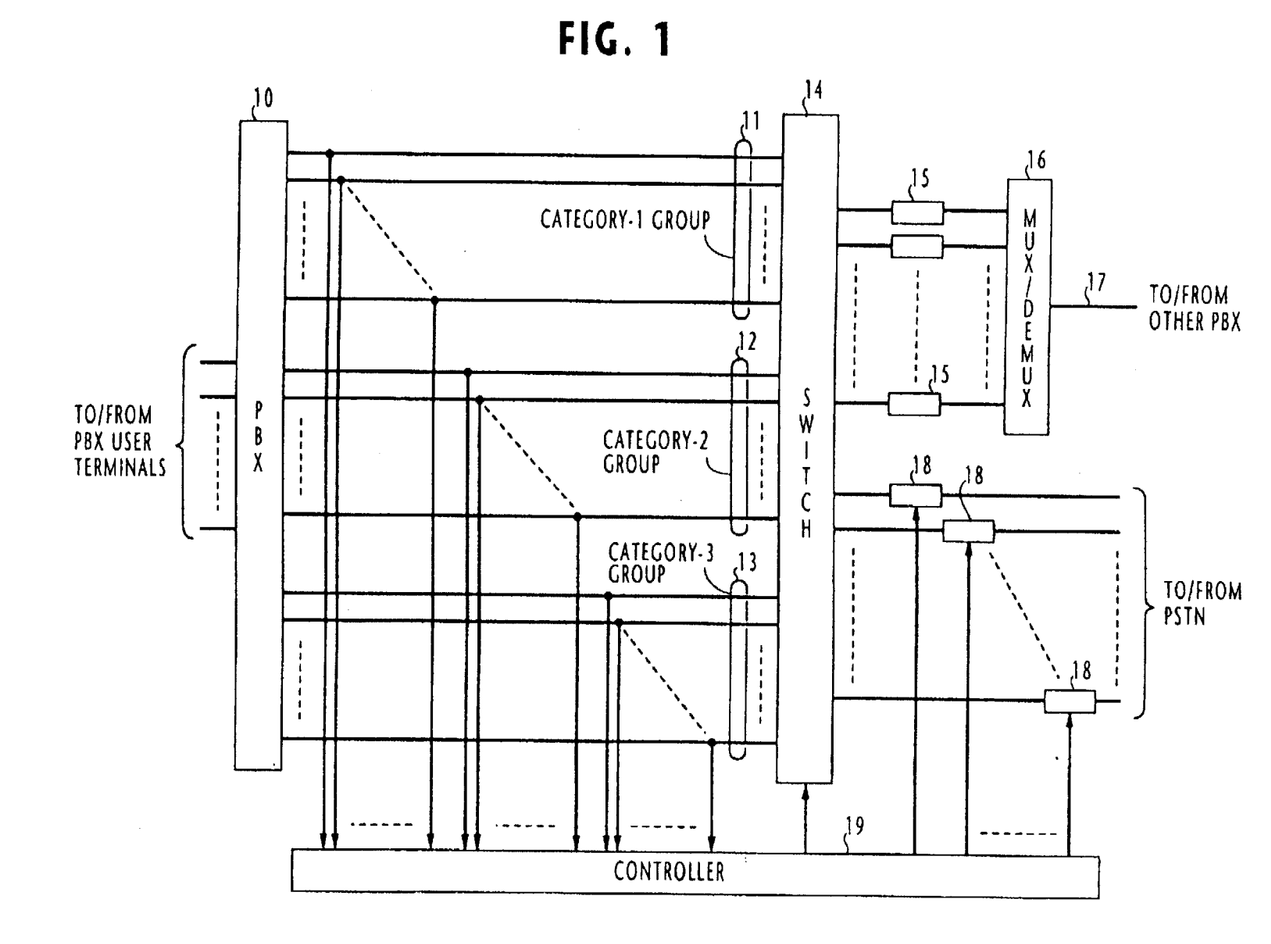
FIG. 1 is a block diagram of an inter-PBX routing circuit embodying the present invention.

In FIG. 1, there is shown an inter-network routing circuit for private branch exchanges (PBXs) according to the present invention. The inventive routing circuit includes a switch 14 connected to outgoing trunk circuits of a PBX switch 10 for establishing connections to a distant PBX through a multiplexed, high-speed transmission facility, or tie line 17 on a demand-assigned basis. In the event that the tie line is likely to be overflowed during heavy traffic periods, the routing circuit provides routing of calls through a public switched telecommunications network (PSTN) transmission facility by establishing a virtual tie line.

The PBX 10 accommodates various classes of user terminals including telephone, facsimile, computers, teleconferencing systems, and so forth. These communication media are carried by inter-PBX channels operating at different transmission speeds, 64-kbps, 48-kbps, 32-kbps, 16-kbps and 8-kbps, for example. According to the present invention inter-PBX channels are classified into the following three categories of service.

(1) Channels which require an alternate route through PSTN when the tie line is overflowed and cannot tolerate delays when setting up the alternate route are classified under category-1;

(2) Channels which require the alternate PSTN route when the tie line is overflowed and can tolerate the delays involved are classified under category-2; and (3) Channels which do not require alternate routing through PSTN when the tie line is overflowed are classified under category-3.

As illustrated in FIG. 1, the outgoing ports of the PBX switch 10 are separated into a category-1 group 11, a category-2 group 12 and a category-3 group 13, and are connected to the inlet ports of the switch 14. Each of the category groups 11, 12 and 13 may contain channels of different transmission speeds. The outlet ports of switch 14 are separated into two groups. The first group is connected via tie-line trunk circuits 15 and a multiplexer/demultiplexer 16 to the tie line 17, and the second group is connected via PSTN trunk circuits 18 to the PSTN. All the outlet ports of PBX switch 10 are connected to a controller 19 to permit it to determine their categories and busy/idle states and to control the switch 14 to establish connections between the inlet and outlet ports of switch 14. Other functions of controller 19 include the ability to receive user's dialed information from the PBX 10 for sending it through tie-line trunk circuits 15 to the distant PBX, and the ability to control PSTN trunk circuits 18, when the tie line 17 is overflowed, for sending the telephone number of the distant PBX through the PSTN trunk circuits 18 to the PSTN in order to establish a virtual tie line and user's dialed information to the distant PBX through the virtual tie line. Additionally, controller 19 keeps a record of traffic carried by the tie line 17 to detect the residual bandwidth of tie line 17 to determine whether an overflow condition is likely.

Figure 2:
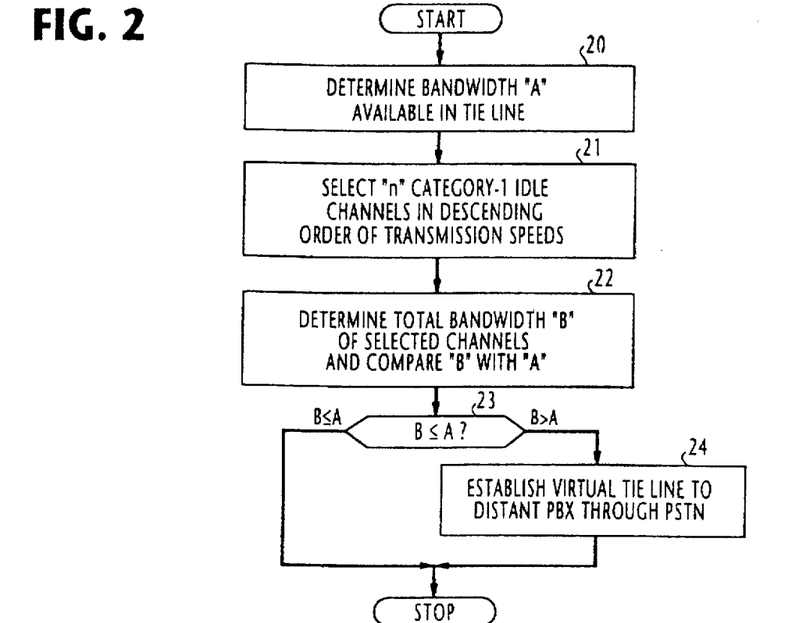
FIG. 2 is a flowchart for illustrating the operation of the controller of the routing circuit during an overflow check routine.
Figure 3:
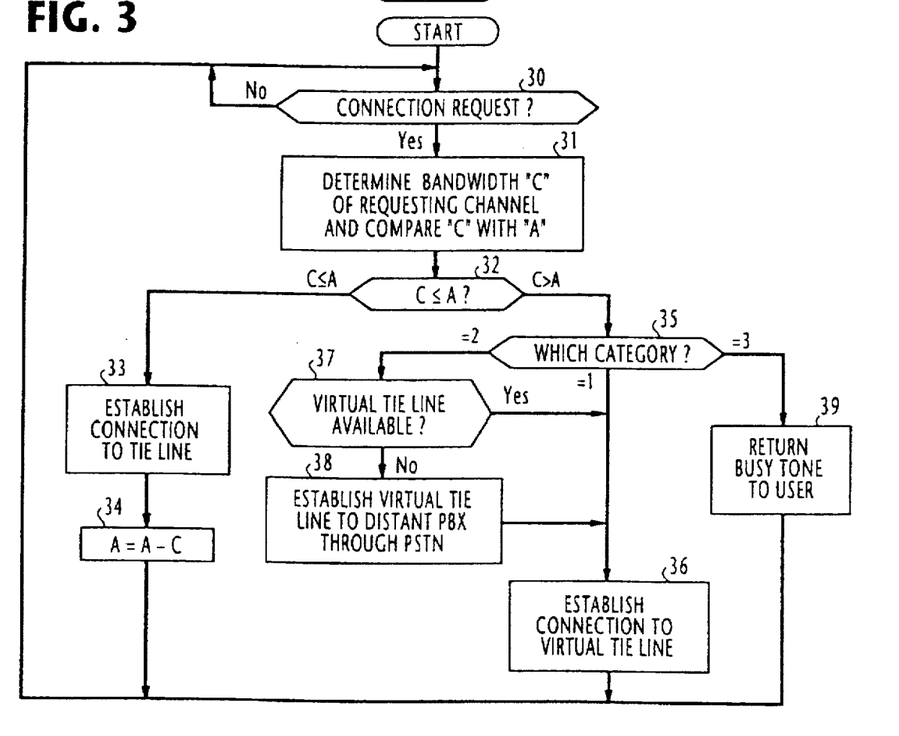
FIG. 3 is a flowchart for illustrating the operation of the routing circuit controller during a restoration check routine.
Figure 4:
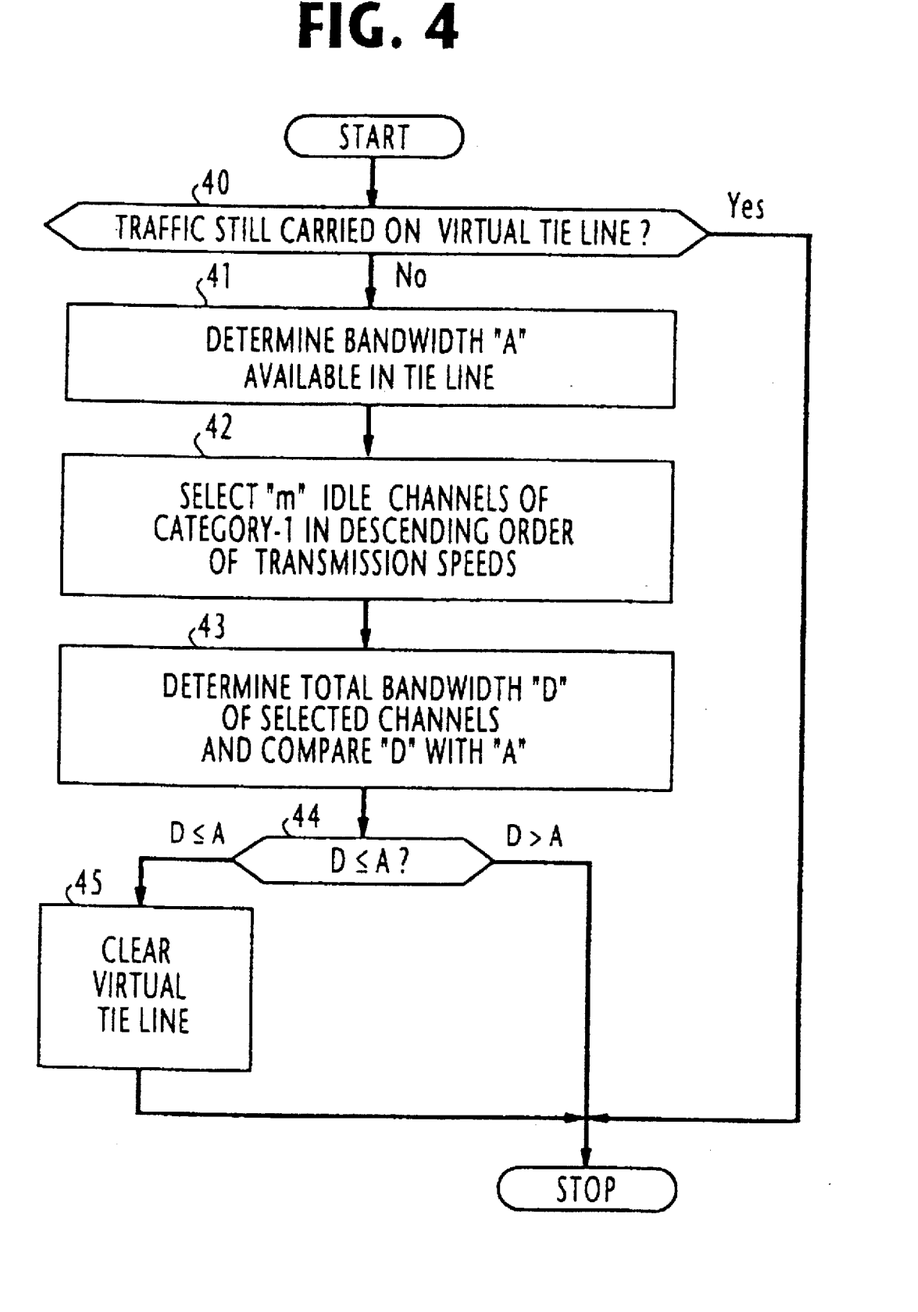
FIG. 4 is a flowchart for illustrating the operation of the restoration check routine on the virtual tie line at periodic intervals.

The operation of the controller 19 proceeds in accordance with flowcharts of FIGS. 2, 3 and 4.

In FIG. 2, controller 19 provides an overflow check routine on the tie line 17 at periodic intervals. This routine starts with block 20 where controller 19 determines the residual bandwidth "A" available in the tie line 17. Controller 19 then selects, at block 21, "n" category-1 idle channels from the channel group 11 in descending order of transmission speeds (i.e., bandwidths), where "n" is equal to or greater than one. At block 22, controller 19 determines the total bandwidth "B" of the selected category-1 channels and compares it with the bandwidth "A".

If B is equal to smaller than A (block 23), it is determined that tie line 17 has a sufficient remaining capacity to carry their traffic even when the selected channels simultaneously issue connection requests, and flow proceeds to the end of the overflow check routine. If B is greater than A, it is determined that tie line 17 has no sufficient remaining capacity to carry their total traffic, and flow proceeds from block 23 to block 24 to establish a virtual tie line to the distant PBX through the PSTN by automatically sending to it the telephone number of the distant PBX. Flow proceeds to the end of the routine following the virtual line being setup in the PSTN.

In FIG. 3, controller 19 provides a connection setup routine by constantly scanning across all inlet ports of switch 14 to check to see if there is a request to establish a connection to the distant PBX (block 30). If there is one, flow proceeds to block 31 where the controller identifies the bandwidth "C" of the requesting channel or channels and compares it with the available bandwidth "A" determined by the overflow check routine, FIG. 2. If C is equal to or smaller than A, it is determined, at block 32, that tie line 17 has a sufficient residual capacity to carry the traffic of the requesting channel and flow proceeds from block 32 to block 33 to establish a connection in the switch 14 between the inlet port of the requesting channel and one of the tie-lie trunk circuits 15. Exit then is to block 34 where the available bandwidth "A" of tie line 17 is updated by subtracting C from A. If C is grater than A, it is determined that tie line 17 has no sufficient remaining bandwidth to carry the traffic of the requesting channel and flow proceeds to decision block 35 to identify which category the requesting channel belongs to.

If the requesting channel is identified as category-1 group, flow proceeds from block 35 to block 36 where the controller 19 establishes a connection in the switch 14 between the requesting channel and one of the PSTN trunk circuits 18, so that the traffic of the requesting channel is carried by the virtual tie line to the distant PBX.

If the requesting channel is identified as category-2 group, flow proceeds from block 35 to block 37 where the controller checks to see if a virtual tie line is available. If it is, flow proceeds to block 36 to establish a connection in the switch 14 to one or more of the PSTN trunk circuits 18 leading to the established virtual tie line. If no virtual tie line is available, flow proceeds from block 37 to block 38 where the controller 19 sends the telephone number of the distant PBX through one of the PSTN trunk circuits 18 to the PSTN to establish a virtual tie line in the PSTN. Flow proceeds to block 36 to establish a connection in the switch 14 between the requesting category-2 channel and one of the PSTN trunk circuits that is connected to the just-established virtual tie line.

If C is greater than A and the requesting channel is identified as category-3 group, flow proceeds from block 35 to block 39 where the controller 19 returns a busy tone to the calling user terminal. Following the execution of block 34, 36 or 39, flow returns to the beginning of the connection setup routine to repeat the above process.

In FIG. 4, controller 19 provides a restoration check routine on the virtual tie line at periodic intervals. It begins with block 40 where the controller 19 checks the virtual tie line established in the PSTN to see if it is still carrying traffic. If the virtual tie line is still carrying traffic, flow proceeds to the end of the routine. If no traffic is carried by the virtual tie line, flow proceeds from block 40 to block 41 where the controller determines the bandwidth "A" remaining in the physical tie line 17. At block 42, controller 19 selects "m" idle channels of category-1 group in descending order of transmission speeds, where "m" is an integer equal to or greater than one. Exit then is to block 43 where the controller determines the total bandwidth "D" of the selected channels and compares it with the bandwidth "A". If D is equal to or smaller than A (block 44), it is determined that the amount of inter-PBX traffic has decreased significantly and therefore the virtual tie line is not necessary, and flow proceed to block 45 to clear the virtual tie line by sending a clear-down command signal to the PSTN. If D is greater than A, it is determined that inter-PBX traffic overflowed from the physical tie line is still carried by the virtual tie line, and flow proceeds to the end of the routine.

The overflow check routine of FIG. 2 and the restoration routine of FIG. 4 may be timer interrupt programs to interrupt the connection setup routine of FIG. 3 at periodic intervals.

Figure 5A:
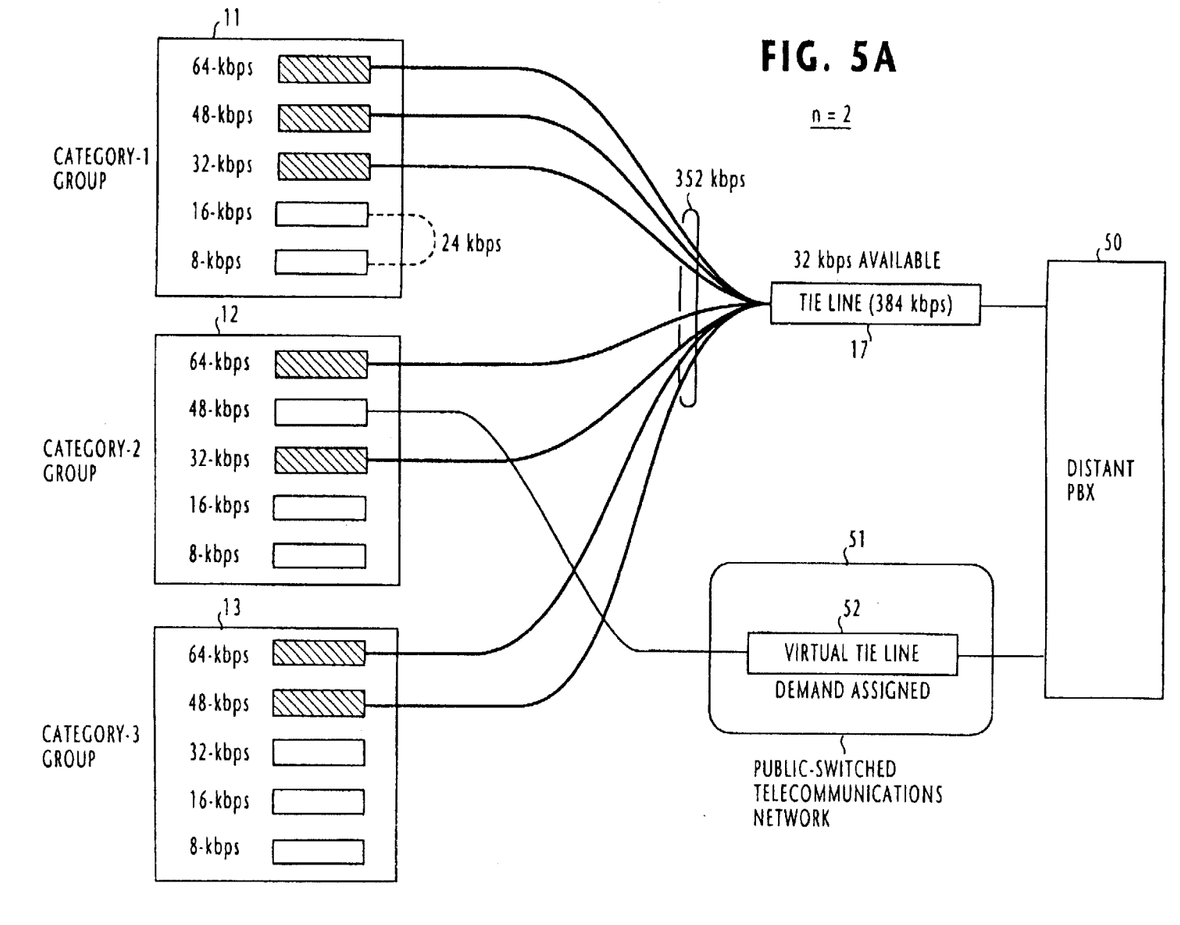
FIGS. 5A and 5B are schematic diagrams illustrating examples for a better understanding of the present invention.
Figure 5B:
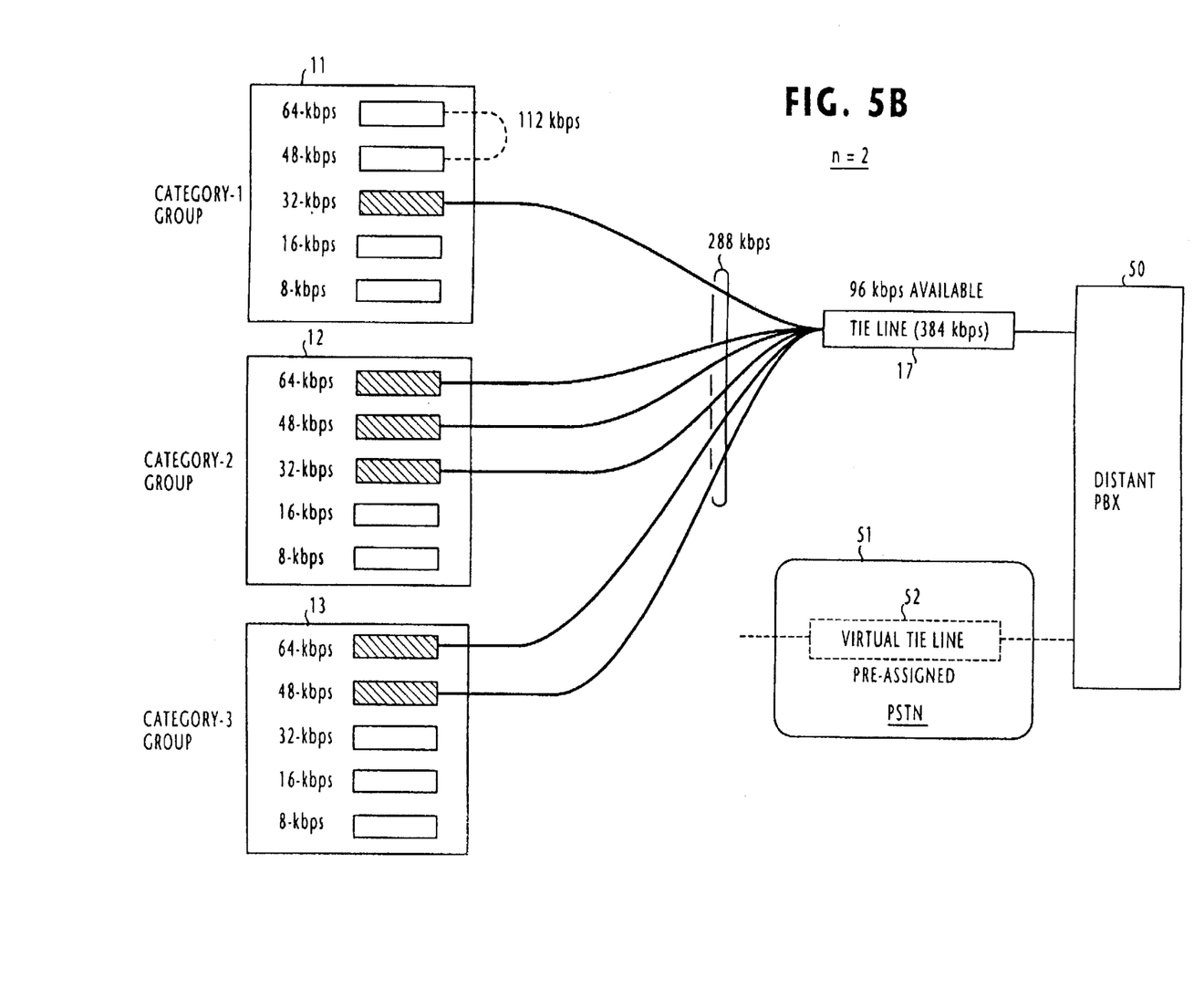

The present invention will be fully understood by the following description of examples shown in FIGS. 5A and 5B by assuming that the tie line 17 has a capacity of 384 kbps and the integer "n" is equal to 2 and that each of the category-1, category-2 and category-3 groups includes channels of transmission speed at 64 kbps, 48 kbps, 32 kbps, 16 kbps and 8 kbps, so that the system has a total bandwidth of 504 kbps.

In FIG. 5A, it is assumed that tie line 17 is carrying traffic of 64-, 48- and 32-kbps category-1 channels, 64- and 32-kbps category-2 channels, and 64- and 48-kbps category-3 channels to a distant PBX 50, as marked by hatching, with a total bandwidth of 352 kbps. Therefore, the remaining bandwidth "A" of the tie line 17 is determined by controller 19 to be equal to 32 kbps at block 20, FIG. 2. Controller 19 then selects, at block 21, two idle category-1 channel, in descending order of transmission speeds, i.e., the 16-kbps and 8-kbps channels, and determines, at block 22, that the total bandwidth "B" of the selected channels is equal to 24 kbps. Since B is smaller than A (block 23), controller 19 proceeds to the end of the routine. At this moment, no virtual tie line is "pre-established" in the PSTN 51. When the connection setup routine, FIG. 3, is invoked and a connection is requested from any one of the channels except for the 48-kbps category-2 channel, the test at block 32 reveals that tie line 17 has a sufficient capacity to carry the track of the requesting channel and flow proceeds to block 33 to control the switch 14 to connect the requesting channel to the distant PBX 50 through the tie line 17. If the 48-kbps category-2 channel requests a connection, the test at block 32 reveals that tie line 17 has no sufficient capacity to catty the traffic of the requesting channel and flow proceeds through block 35 to block 37. Since no virtual tie line is available, the decision at block 37 is negative and flow proceeds to block 38 to establish a virtual tie line 52 to the distant PBX 50 through the PSTN 51. Following the setup of the virtual tie line 52, flow proceeds to block 36 where the controller 19 commands the switch 14 to connect the requesting channel to one of the PSTN trunk circuits 18 to carry its traffic via the virtual tie line 52. In this case, the virtual tie line 52 is established on a demand-assigned basis so that a substantial amount of delay will be introduced. However, since the requesting channel is category-2 group, the delay involved in establishing the alternate route can be tolerated.

In FIG. 5B, it is assumed that tie line 17 is carrying traffic of a 32 -kbps category-1 channel, 64-, 48- and 32-kbps category-2 channels, and 64- and 48-kbps category-3 channels to a distant PBX 50, with a total bandwidth of 288 kbps. Therefore, the remaining bandwidth "A" of the tie line 17 is determined by controller 19 to be equal to 96 kbps at block 20, FIG. 2. Controller 19 selects, at block 21, two idle category-1 channels in descending order of transmission speeds, i.e., the 64-kbps and 48-kbps channels, and determines, at block 22, that the total bandwidth "B" of the selected channels is equal to 112 kbps. Since B is greater than A (block 23), controller 19 proceeds to block 24 to "pre-establish" a virtual tie line 52 in the PSTN 51 in anticipation of two simultaneous requests from the 64- and 48-kbps category-1 channels.

If connections e simultaneously requested from these category-1 channels, blocks 33 and 34, FIG. 3, will be executed for one of the requests to establish a connection through the tie line 17 and block 36 will then be executed for the other request to establish a connection through the virtual tie line without delays.

It will be seen that the integers "n" and "m" are the decision thresholds for determining the timing for establishing a backup route and the timing for clearing it. By appropriately determining these integers, cost-effective inter-PBX routing can be achieved.

While mention has been made of an embodiment in which the routing apparatus of this invention is shown detached from the PBX switch 10, it could equally be incorporated in the PBX switch 10 as part as a switching function. Additionally, while switch 14 has been described as a space division switch, a time-divided space switch could equally be employed by multiplexing the incoming channels into respective time slots of a time-division multiplexed (TDM) signal, coupling the TDM signal to one inlet port of the time-divided space switch and performing time-slot interchanging and space switching on the TDM signal so that its time slots are switched direct to the tie line 17 and to one of the PSTN trunk circuits 18, dispensing with tie-line trunks 15 and multiplexer/demultiplexer 16.

What is claimed is:

1. An apparatus for establishing an alternate route for a plurality of channels in addition to a first transmission route when the first transmission route is overflowed, said channels having different bandwidths and being classified as a first category if said channels cannot tolerate delays when establishing said alternate transmission route or as a second category if said channels can tolerate said delays, comprising control means for establishing a second transmission route on a pre-assigned basis when the bandwidth of at least one idle channel of said first category is greater than a bandwidth available in said first transmission route, and responsive to a request from a channel of said second category for establishing said second transmission route on a demand-assigned basis if the second category channel has a bandwidth greater than the available bandwidth of said first transmission route.

2. An apparatus as claimed in claim 1, wherein said control means comprises means for clearing said second transmission route when no traffic is carried by said second transmission route and at least one idle channel of said first category has a bandwidth equal to or smaller than a bandwidth available in said first transmission route.

3. A routing apparatus comprising:
   a switch connected between a plurality of channel and a first transmission route having a predetermined bandwidth for carrying traffic to a destination; and
   a controller for classifying said plurality of channels as a first category if said channels cannot tolerate delays when establishing an alternate transmission route, as a second category if said channels can tolerate said delays, or as a third category if said channels do not require said second transmission route when the first transmission route is overflowed, establishing a second transmission route between said switch and said destination on a pre-assigned basis when the bandwidth of at least one idle channel of said first category is greater than a bandwidth available in said first transmission route and on a demand-assigned basis in response to a request from a channel of said second category having a bandwidth greater than the available bandwidth of said first transmission route, and controlling said switch to establish a path between a requesting channel of any of said categories and said first transmission route if the requesting channel has a bandwidth equal to or smaller than said available bandwidth or a path between the requesting channel and said second transmission route if said requesting channel is classified as said first or second category and has a bandwidth greater than said available bandwidth, and returning a busy tone to a requesting channel of said third category if the third category requesting channel has a bandwidth greater than said available bandwidth.

4. A routing apparatus as claimed in claim 3, wherein said controller includes means for periodically selecting at least one idle channel from the channels of said first category in descending order of bandwidths, comparing the bandwidth of the selected idle channel with a remaining bandwidth of said first transmission route, and establishing said second transmission route if the bandwidth of the selected idle channel is greater than the remaining bandwidth of the first transmission route.

5. A routing apparatus as claimed in claim 3, wherein said first transmission route comprises a dedicated circuit and said second transmission route comprises a switched circuit established in a public switched telecommunications network.

6. A routing apparatus as claimed in claim 3, wherein said controller includes means for selecting at least one idle channel from the channels of said first category in descending order of bandwidths when no traffic is carried by said second transmission route, comparing the bandwidth of the selected idle channel with a bandwidth available in said first transmission route, and clearing said second transmission route if the bandwidth of the selected idle channel is equal to or smaller than the available bandwidth of the first transmission route.

7. An apparatus for routing a plurality of channels to a first transmission route having a predetermined bandwidth when the first transmission route is not overflowed, said channels having different bandwidths and classified under first or second category if said channels cannot or can tolerate delays when establishing an alternate transmission route, respectively, comprising:

means for periodically selecting "n" idle channels from the channels of said first category in descending order of bandwidths, where "n" is an integer equal to or greater than one, determining a remaining bandwidth available in said first transmission route, and establishing a second transmission route on a pre-assigned basis when the total bandwidth of the selected "n" idle channels is greater than said remaining bandwidth;

means responsive to a request from a channel of said second category for determining a remaining bandwidth available in said first transmission route, and establishing said second transmission route on a demand-assigned basis if the second category channel has a bandwidth greater than the remaining bandwidth; and means for periodically selecting "m" idle channels from the channels of said first category in descending order of bandwidths, where "m" is an integer equal to or greater than one, determining a remaining bandwidth available in said first transmission route, and clearing said second transmission route when no traffic is carried by said second transmission route and the total bandwidth of the selected "m" idle channels is equal to or smaller than the remaining bandwidth.

8. A method for establishing an alternate route for a plurality of channels of different bandwidths in addition to a first transmission route having a predetermined bandwidth, comprising the steps of:

classifying said channels under first or second category if said channels cannot or can tolerate delays when establishing said alternate transmission route, respectively;

establishing a second transmission route as said alternate route on a pre-assigned basis when the bandwidth of at least one idle channel of said first category is greater than a bandwidth available in said first transmission route; and responsive to a request from a channel of said second category, establishing said second transmission route on a demand-assigned basis if the second category channel has a bandwidth greater than the available bandwidth of said first transmission route.

9. A method as claimed in claim 8, further comprising the step of clearing said second transmission route if at least one idle channel of said first category has a bandwidth equal to or smaller than a bandwidth available in said first transmission route when no traffic is carried by said second transmission route.

10. A routing method for a plurality of channels having different bandwidths, said channels being classified under first or second category if said channels cannot or can tolerate delays, respectively, when establishing an alternate transmission route, comprising the steps of:

a) establishing a second transmission route on a pre-assigned basis when the bandwidth of at least one idle channel of said first category is greater than a bandwidth available in said first transmission route and on a demand-assigned basis in response to a request from a channel of said second category having a bandwidth greater than the available bandwidth of the first transmission route; and b) connecting a requesting channel to said first transmission route if the requesting channel has a bandwidth equal to or smaller than said available bandwidth or connecting the requesting channel to said second transmission route if said requesting channel has a bandwidth grater than said available bandwidth.

11. A routing method as claimed in claim 10, further comprising the steps of:

selecting at least one idle channel from the channels classified under said first category in descending order of bandwidths when no traffic is carried by raid second transmission route; and clearing said second transmission route if the selected idle channel has a bandwidth equal to or smaller than a bandwidth available in said first transmission route.

12. A routing method as claimed in claim 10, wherein said channels are further classified under a third category if said channels do not require said second transmission route when said first transmission route is overflowed, wherein step (b) further comprises the step of returning a busy tone to a requesting channel of said third category having a bandwidth greater than said available bandwidth.

13. A routing method as claimed in claim 12, further comprising the steps of:

selecting at least one idle channel from the channels classified under said first category in descending order of bandwidths when no traffic is carried by said second transmission route; and clearing said second transmission route if the selected idle channel has a bandwidth equal to or smaller than a bandwidth available in said first transmission route.

14. A method for routing a plurality of channels to a first transmission route having a predetermined bandwidth when the first transmission route is not overflowed, said channels having different bandwidths and classified under first or second category if said channels cannot or can tolerate delays when establishing an alternate transmission route, respectively, comprising:

a) selecting "n" idle channels from the channels of said first category in descending order of bandwidths, where "n" is an integer equal to or greater than one;

b) determining a remaining bandwidth available in said first transmission route;

c) establishing a second transmission route on a pre-assigned basis when the total bandwidth of the selected "n" idle channels is greater than the remaining bandwidth determined by step (b);

d) responsive to a request from a channel of said second category, determining a remaining bandwidth available in said first transmission route;

e) establishing said second transmission route on a demand-assigned basis if the second category channel has a bandwidth greater than the remaining bandwidth determined by step (d);

f) selecting "m" idle channels from the channels of said first category in descending order bandwidths, where "m" is an integer equal to or greater than one;

g) determining a remaining bandwidth available in said first transmission route; and h) clearing said second transmission route when no traffic is carried by said second transmission route and the total bandwidth of the selected "m" idle channels is equal to or smaller than the remaining bandwidth determined by step (g).

15. A routing method for a plurality of channels having different bandwidths, said channel being classified under first or second category if said channels cannot or can tolerate delays, respectively, when establishing an alternate transmission route, comprising the steps of:

a) selecting at least one idle channel from the channel classified under said first category in descending order of bandwidths;

b) comparing the bandwidth of the selected idle channel with a bandwidth available in a first transmission route;

c) establishing a second transmission route on a pre-assigned basis if the idle channel selected by step (a) has a bandwidth greater than said available bandwidth of the first transmission route;

d) establishing said second transmission route on a demand assigned basis if there is a requesting channel of said second category having a bandwidth greater than said available bandwidth;

e) selecting at least one idle channel from the channels classified under said first category in descending order of bandwidths when no traffic is carried by said second transmission route;

f) comparing the bandwidth of the idle channel selected by step (e) with a bandwidth available in said first transmission route; and g) clearing said second transmission route if the idle channel selected by step (e) has a bandwidth equal to or smaller than the available bandwidth of the first transmission route.

* * * * *